Sept. 13, 1966 R. M. LINZ ET AL 3,272,922
RECEIVER CIRCUIT FOR STEREO SEPARATION
Filed Dec. 31, 1963
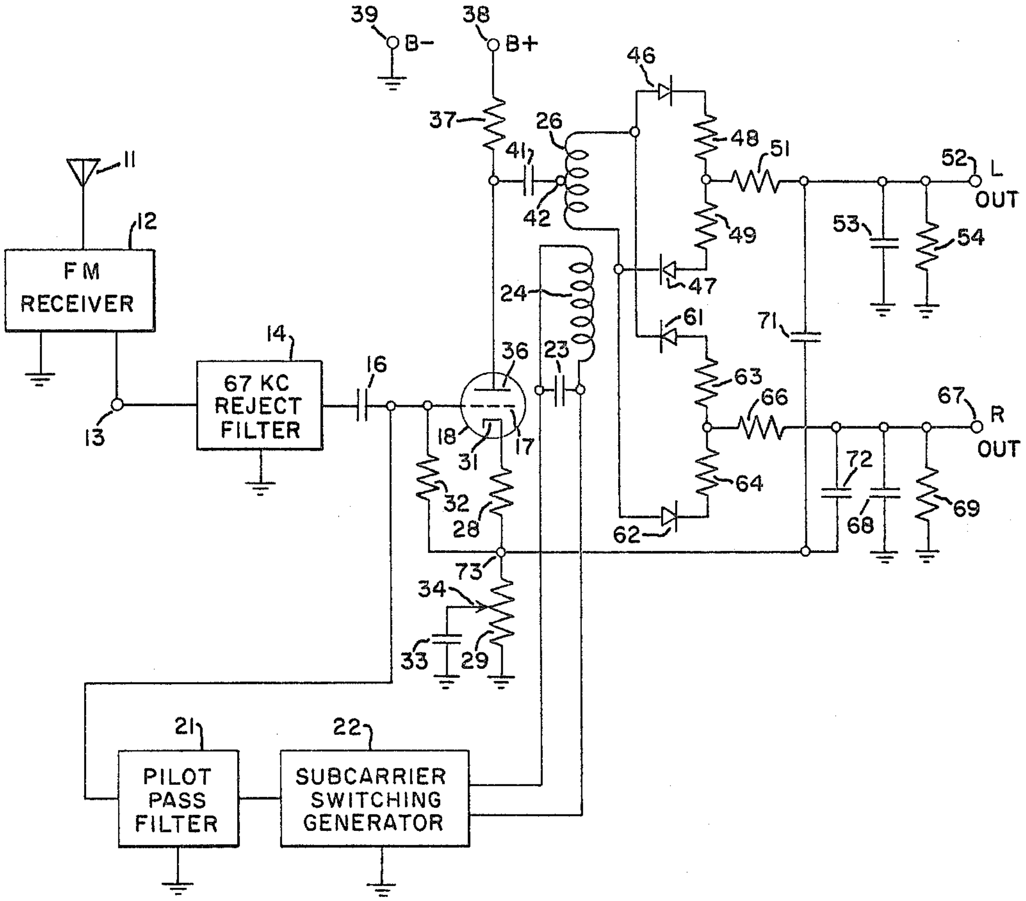
INVENTORS:
ROBERT M. LINZ,
ANTAL CSICSATKA,
BY Norman C. Fulmer
THEIR ATTORNEY.

United States Patent Office 3,272,922

Patented Sept. 13, 1966

3,272,922

RECEIVER CIRCUIT FOR STEREO SEPARATION

Robert M. Linz and Antal Csicsatka, Utica, N.Y., assignors to General Electric Company, a corporation of New York Filed Dec. 31, 1963, Ser. No. 334,941
5 Claims. (Cl. 179—15)

This invention relates to improvements in circuits used to derive separate stereophonic signals from sum and difference combinations of these signals, such as are conveyed in accordance with the present Federal Communications Commission standards for frequency modulation stereophonic transmission. More particularly, the invention relates to circuitry for improving the separation or "purity" of the stereo signals produced in radio receivers.

In the stereo broadcasting system, audio signals L and R, which represent respectively the audio signals generated by left and right microphones, for example, are transmitted by modulating the frequency of a main carrier in accordance with the amplitude variation of the sum of the two signals, i.e., $L+R$, and the main carrier also is frequency modulated with the amplitude variations of the sideband products resulting from an amplitude modulation of a 38 kilocycle per second subcarrier with a difference combination of the two stereo signals, i.e., $L-R$. The 38 kilocycle subcarrier is suppressed so that it does not accompany the other components of the broadcast signal. A subharmonic 19 kilocycle pilot signal is transmitted, which functions as a reference signal at receivers for reconstituting the 38 kilocycle subcarrier.

The combination of the $L+R$ signal, the $L-R$ sidebands of the suppressed subcarrier, and the pilot signal, is called the "composite" signal.

In order to derive the separate L and R audio signals from the composite signal, it has heretofore been proposed, in accordance with well-known theory, that one of these signals be derived by sampling the composite signal at times corresponding to the positive excursions of the 38 kilocycle suppressed subcarrier and that the other stereo signal be derived by sampling the composite signal at times corresponding to the negative excursions of the 38 kilocycle subcarrier wave. This sampling is performed by a sampling circuit that is controlled by a 38 kilocycle switching signal derived in a switching signal generator from or under the control of the pilot signal. For example, if samples of the left stereo signal L are obtained during excursions of the switching signal corresponding in time to positive excursions of the subcarrier, then samples of the right stereo signal R are obtained during excursions of the switching signal corresponding in time to negative excursions of the subcarrier. Each of the signals L and R is then frequency de-emphasized, if they have been pre-emphasized at the transmitter (in well-known manner), so as to yield the original audio signals L and R at separate outputs for application (after amplification if desired) to separate "left" and "right" loudspeakers.

An alternative receiver circuit for deriving the L and R signals employs, instead of a time-sampling arrangement, an AM detector for deriving the $L-R$ signal from the composite signal, and a matrix circuit for combining the $L+R$ and $L-R$ signals additively and subtractively, which provides L and R output signals.

In each of the above-described types of stereo demodulators, i.e., the time-sampling type and the AM detector-matrix type, it has been difficult to obtain good stereo separation of the left and right audio output signals—i.e., the L signal is usually contaminated with a bit of undesired R signal, and the R signal is usually contaminated with a bit of undesired L signal. In the time-sampling type of circuit, a way to improve the stereo separation, is to provide a circuit for slightly increasing the amplitude of the $L-R$ sideband portion of the composite signal prior to the time-sampling stage. In the AM detector-matrix circuit, the circuit is carefully designed to provide a relative phase and amplitude ratio of the $L+R$ and $L-R$ signals in the matrix to provide optimum stereo separation.

In spite of the above-described efforts to improve the stereo separation, the results are not always satisfactory. If the circuits are adjusted for good stereo separation at the lower audio frequencies, then the separation is poor at the higher audio frequencies. Conversely, if the circuits are adjusted for good stereo separation at the high audit frequencies, then the separation is poor at the lower audio frequencies. It is customary to adjust the circuits for a compromise stereo separation—i.e., the circuits are adjusted for a separation that lies between poor and good at both the high and low audio frequencies, with really good separation only at the mid-range of audio frequencies. This tends to result in mediocre and unsatisfactory stereo separation.

An object of the invention is to provide a stereo receiver circuit for achieving improved separation of the stereo output signals.

Other objects will be apparent from the following disclosure and claims, and from the drawing in which:

The single figure of the drawing is an electrical schematic diagram of a preferred embodiment of the invention.

The invention comprises, briefly and in its preferred embodiment, a stereo receiver having first circuit for improving stereo separation at the lower audio frequencies, and a second circuit for improving the stereo separation at the higher audio frequencies. This second circuit preferably comprises a pair of capacitors connected to feed a certain amount of $-(L+R)$ signal to the respective L and R stereo channels, in a proper phase to achieve a small amount of signal cancellation, the values of these capacitors being sufficiently small so that only the higher audio frequencies are effective in the signal cancellation achieved by this second circuit. These separate cross-talk compensation circuits for the low and for the high audio frequencies, in accordance with the invention, achieve considerable improvement in electrical separation or "purity" of the reproduced stereo signals.

Now referring to the drawing, an antenna 11 picks up the FM stereo signal in a normal manner, and applies it to an FM receiver circuit 12 which normally includes a mixer circuit, intermediate amplifier stages, and a demodulator of the limiter-discriminator type or ratio-detector type. The output of the FM receiver 12 comprises, at the output terminal 13 thereof, the composite signal which comprises the $L+R$ signal combination in a range of some 50 to 15,000 cycles per second, a pilot signal (at 19 kilocycles per the FCC standards) and $L-R$ sidebands of a suppressed amplitude modulated subcarrier, these sidebands extending between 23 kc./s. and 53 kc./s. The signal at output terminal 13 also might include a commercial program signal in the vicinity of 67 kc. The signals are fed, from terminal 13, through a 67 kc. reject filter 14 which rejects the commercial program signal, and the FM stereo composite signal then is fed through a coupling capacitor 16 to a control electrode 17 of an amplifier device 18 which may be of the vacuum tube type.

The stereo composite signal also is fed, via the coupling capacitor 16, through a pilot signal pass filter 21 which passes only the 19 kc. pilot signal, and this pilot signal is applied to a subcarrier switching generator 22 which may be a synchronous oscillator or other circuit arrangement for doubling the frequency of the 19 kc. and producing a 38 kc. switching signal under the control of the 19 kc. pilot signal. An output tuned circuit of the switching generator 22, shown as comprising a tuned circuit having a capacitor 23 connected in parallel with an inductor 24, is inductively coupled to a winding 26.

A bias resistor 28 and a potentiometer resistance element 29 are connected, in the named order, between a cathode 31 of tube 18 and electrical ground. A resistor 32 is connected between the control grid 17 and the junction of the resistors 28 and 29. A capacitor 33 is connected between an adjustable tap 34 of the potentiometer 29 and electrical ground, and functions to increase the amplitude of the $L-R$ sidebands with respect to the $L+R$ portion of the composite signal, at the output anode 36 of the tube 18, as is fully described in co-pending patent application Serial No. 269,374, filed April 1, 1963, and assigned to the same assignee as the present invention. A load resistor 37 is connected between the anode 36 and a terminal 38 of B+ operating voltage of which the negative terminal 39 is electrically grounded. A coupling capacitor 41 is connected between the anode 36 and a center tap 42 of the winding 26.

The stereo demodulator circuit, which in the embodiment shown in the drawing is of the time-sampling type, includes a "left" signal sampling circuit comprising a pair of diodes 46, 47 having unlike electrodes connected respectively to the ends of the winding 26. A pair of load resistors 48, 49 are connected in series between the remaining electrodes of the diodes 46, 47, and a resistor 51 and is connected between the junction of the resistors 48, 49, and the left signal output terminal 52. A capacitor 53 is connected between the terminal 52 and ground, and, in conjunction with the resistor 51, forms a conventional de-emphasis circuit for the audio signal. A resistor 54 is connected between the output terminal 52 and electrical ground, to provide a discharge path for the capacitor 53.

Similarly, a "right" signal sampling circuit comprises a pair of diodes 61, 62 having unlike electrodes connected respectively to the ends of the winding 26, these electrodes being unlike the electrodes of the diodes 46, 47 which are connected to the winding 26, as shown. Load resistors 63 and 64 are connected in series between the remaining electrodes of the diodes 61 and 62, and a resistor 66 is connected between a "right" signal output terminal 67 and the junction of resistors 63 and 64. A capacitor 68 is connected between the right signal output terminal 67 and electrical ground and, in conjunction with the resistor 66, provides a well-known de-emphasis circuit for the "right" stereo output signal. A resistor 69 is connected between the terminal 67 and electrical ground, to provide a discharge path for the capacitor 68.

The circuit thus far described has previously been known, and functions as follows. The stereo composite signal is amplified by the amplifier device 18, and is applied through the capacitor 41 to the center tap 42 of the winding 26 of the sampling circuit. The subcarrier switching generator 22, under control of the pilot signal which is selectively passed by the filter 21, produces a 38 kc. switching signal at the tuned circuit 23–24, and this switching signal is inductively coupled to the winding 26. During the half-cycles of this switching signal when the upper end of the winding 26 is positive and the lower end thereof is negative, both of the diodes 46 and 47 will be biased into a conductive condition, whereupon the composite signal passes through the two halves of the secondary winding 26, and through the respective diodes 46, 47 and the resistors 48, 49, to the de-emphasis network comprising resistor 51 and capacitor 53. If the sampling signal is properly phased with respect to the suppressed subcarrier, as is well-known to those skilled in the art, this sampling of the composite signal during a half-cycle of switching voltage, will provide a "left" stereo signal at the output terminal 52.

During the other half-cycles of the switching signal, i.e., when the upper end of winding 26 is negative and the lower end thereof is positive, both of the diodes 61 and 62 will be rendered conductive, whereupon the composite signal will pass through the respective halves of the winding 26, from the input center tap 42 thereof, and through the diodes 61 and 62 and resistors 63 and 64, respectively, to the de-emphasis network 66–68, thereby providing a sample of the "right" stereo signal at the output terminal 67, in a manner well-known to those skilled in the art.

For optimum operation of the above-described circuit, the tap 34 of potentiometer 29 is adjusted to increase the relative amplitude of the $L-R$ sidebands with respect to the $L+R$ signal component, in order to achieve the most satisfactory separation of the left and right output stereo signals that can be obtained with this circuit. However, even at best, the left output signal will be contaminated with some R signal, and the R output signal will be contaminated with a certain amount of the left signal. In accordance with prior art practice, the variable tap 34 of potentiometer 29 is adjusted for a comprised best result, whereby the stereo separation of the output signals is better at the mid-range of audio frequencies than at the high and low audio frequencies. The differences in stereo separation at different audio frequencies is largely due to non-linear characteristics of certain circuitry. For example, the FM receiver 12 and the 67 kc. reject filter 14 each have a non-linear phase characteristic with respect to audio frequency, and the equalizing network 29, 33 does not have an ideal characteristic of amplitude with respect to frequency.

In accordance with the present invention, the stereo separation adjustment tap 34 of potentiometer 29 is adjusted for optimum stereo separation at the lower audio frequencies, for example about 50 to 1,000 cycles per second, which results in some undesired R signal of higher audio frequencies in the L output signal at terminal 52 and some undesired L signal of higher audio frequencies in the R output signal at terminal 67, and a pair of compensation capacitors 71 and 72 are respectively connected between the upper end 73 of the potentiometer 29 and the left and right signal output terminals 52 and 67, as shown. The values of these capacitors 71 and 72 are sufficiently small so that only the higher audio frequencies, for example above 1,000 cycles per second, pass through them to the output terminals 52 and 67. The audio signal appearing at point 73, is a $-(L+R)$ signal, for example and for the purpose of this invention, since the $L-R$ sidebands are in a frequency range above audibility, and also become substantially filtered out and eliminated by the capacitors 53 and 68. For the purposes of this invention, the phase of the signal at point 73 compared to the phase of the stereo output signals at output terminals 52 and 67, is a relative, the important thing being that the $L+R$ signal at point 73 should be of opposite polarity to that of the stereo output signals at terminals 52 and 67. In the example, the higher audio frequency components of the $-(L+R)$ signal will be fed, via the capacitors 71 and 72, respectively, to the stereo signal output terminals 52 and 67. At the terminal 52, this component of the $-(L+R)$ signal combines with the L output signal and the undesired amount of R signal which lies in the higher part of the audio frequency range, so as to cancel out and eliminate the undesired R signal component, thus leaving a substantially "pure" L output signal at the terminal 52, this resulting L output signal being only slightly reduced in amplitude at the higher audio frequencies due to the cancellation provided by the connection of capacitor 71 in the circuit. Similarly, the $-(L+R)$ signal component applied via capacitor 72 to the right signal output terminal 67, causes cancellation of the undesired small amount of higher-frequency left signal at this terminal, thereby leaving a substantially "pure" right signal which has been only slightly attenuated by the cancellation process.

From the foregoing description it will be seen that our invention achieves improved separation or purity of the stereo output signals, by providing good separation at the lower audio frequencies by means of a first compensation circuit such as the combination of capacitor 33 and potentiometer 29, and provides a second cancellation circuit effective only at the higher audio frequencies, for achieving good stereo separation at the higher audio frequencies, whereby the overall result is good stereo separation over the entire audio frequency range of the stereo output signals of the circuit. This is a considerable improvement over the prior art compromise in which only a single compensation circuit, such as the circuit shown comprising capacitor 33 and potentiometer 29, was adjusted to a compromise condition which only partial improvement of stereo separation was obtainable at both higher and lower audio frequencies. The first compensation circuit could be, instead of the circuit 29, 33 as shown, a filter interposed in the path of the composite signal and adapted to attenuate the $L+R$ component relative to the $L-R$ sidebands.

Although the invention has been shown and particularly described as applied to a time-sampling type of stereo demodulator, the invention also is applicable to the AM detector and matrix type of stereo demodulator circuit.

While a preferred embodiment of the invention has been shown and described, various other embodiments and modifications thereof will be apparent to those skilled in the art, and will fall within the scope of invention as defined in the following claims.

What we claim is:

1. In a reception circuit having a stereo demodulation circuit for deriving L and R stereo output signals from a composite signal comprising an $L+R$ signal component and $L-R$ sidebands, in which the L output signal tends to contain an undesired component of R signal and the R output signal tends to contain an undesired component of L signal, means for improving the stereo separation of said L and R output signals, comprising first compensation means connected and adapted to substantially reduce the amplitudes of said undesired components in a first part of the audio frequency range, and second compensation means connected and adapted to substantially reduce the amplitudes of said desired components only in a second part of the audio frequency range.

2. In a reception circuit having a stereo demodulator circuit for deriving L and R stereo output signals from a composite signal comprising an $L+R$ signal components and $L-R$ sidebands, in which the L output signal tends to contain an undesired component of R signal and the R output signal tends to contain an undesired component of L signal, means for improving the stereo separation of said L and R output signals, comprising a first compensation circuit connected and adapted to substantially reduce the amplitudes of said undesired components at the lower audio frequencies, and a second compensation circuit connected and adapted to substantially reduce the amplitudes of said undesired components only at the higher audio frequencies.

3. A circuit as claimed in claim 2, in which said second compensation circuit comprises a pair of capacitors respectively connected to apply the $L+R$ signal to the L and R output signals with opposite phase with respect thereto, said capacitors having values of capacitance so as to pass only the higher audio frequency portion of the $L+R$ signal.

4. In a reception circuit having a stereo demodulator circuit for deriving L and R stereo output signals from a composite signal comprising an $L+R$ signal component and $L-R$ sidebands, in which the L output signal tends to contain an undesired component of R signal and the R output signal tends to contain an undesired component of L signal, means for improving the stereo separation of said L and R output signals, comprising a phase-inverting amplifier for said composite signal and adapted to provide the composite signal in a first phase and in an inverted phase, means to apply said composite signal in the first phase to said stereo demodulator circuit, compensation means connected and adapted to substantially reduce the amplitudes of said undesired components at the lower audio frequencies, and a pair of capacitors respectively connected to apply said composite signal in inverted phase to the L and R output signals, said capacitors having values of capacitance so as to pass only the higher audio frequency portion of the $L+R$ signal thereby to cause substantial reduction in amplitude of said undesired components only at the higher audio frequencies.

5. A method for improving separation of L and R stereo output signals in a circuit for deriving the L and R stereo output signals from a composite signal comprising an $L+R$ signal component and $L-R$ sidebands, said circuit including compensation means capable of providing good stereo separation of the L and R output signals at high or at low audio frequencies but at high and low audio frequencies simultaneously, said method comprising the steps of adjusting said compensation means to provide good stereo separation of the L and R output signals at the low audio frequencies, and providing means to additionally compensate only at the higher audio frequencies thereby achieving good stereo separation over the entire audio frequency range.

References Cited by the Examiner

UNITED STATES PATENTS

| | | | |
|---|---|---|---|
| 3,123,673 | 3/1964 | Stempers et al. ------ | 179—15 |
| 3,167,615 | 1/1965 | Wilhelms et al. ------ | 179—15 |
| 3,175,040 | 3/1965 | Reckinghausen ------- | 179—15 |

OTHER REFERENCES

DeVircs: IRE Transaction on Broadcast and Television Receivers, July 1961.

DAVID G. REDINBAUGH, *Primary Examiner.*

R. L. GRIFFIN, *Assistant Examiner.*

UNITED STATES PATENT OFFICE

CERTIFICATE OF CORRECTION

Patent No. 3,272,922 September 13, 1966

Robert M. Linz et al.

It is hereby certified that error appears in the above numbered patent requiring correction and that the said Letters Patent should read as corrected below.

Column 6, line 36, for "but at high" read -- but not at high --.

Signed and sealed this 5th day of September 1967.

(SEAL)
Attest:

ERNEST W. SWIDER
Attesting Officer

EDWARD J. BRENNER
Commissioner of Patents